US007877376B2

(12) United States Patent
Thiyagarajan et al.

(10) Patent No.: US 7,877,376 B2
(45) Date of Patent: Jan. 25, 2011

(54) SUPPORTING AGGREGATE EXPRESSIONS IN QUERY REWRITE

(75) Inventors: Murali Thiyagarajan, Concord, NH (US); Praveen Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 521 days.

(21) Appl. No.: 11/879,990

(22) Filed: Jul. 18, 2007

(65) Prior Publication Data

US 2009/0024571 A1 Jan. 22, 2009

(51) Int. Cl.
*G06F 7/00* (2006.01)
(52) U.S. Cl. ...................................... 707/717
(58) Field of Classification Search ............ 707/2, 707/717
See application file for complete search history.

(56) References Cited

U.S. PATENT DOCUMENTS

| | | | |
|---|---|---|---|
| 5,991,754 A | 11/1999 | Raitto et al. | |
| 6,199,063 B1* | 3/2001 | Colby et al. | 707/4 |
| 6,334,128 B1 | 12/2001 | Norcott et al. | |
| 6,449,606 B1 | 9/2002 | Witkowski | |
| 6,526,403 B1 | 2/2003 | Lin et al. | |
| 6,629,094 B1* | 9/2003 | Colby et al. | 707/4 |
| 7,599,925 B2* | 10/2009 | Larson et al. | 707/4 |
| 2004/0122814 A1* | 6/2004 | Zhang et al. | 707/4 |
| 2006/0122964 A1 | 6/2006 | Yu et al. | |
| 2006/0230017 A1 | 10/2006 | Larson et al. | |
| 2006/0271529 A1 | 11/2006 | Dhamijia et al. | |
| 2009/0228432 A1 | 9/2009 | Thiyagarajan et al. | |

OTHER PUBLICATIONS

Praveen Kumar and Murali Thiyagarajan, "Supporting Aggregate Expressions in Query Rewrite," pp. 1-18.
Randall G. Bello et al., "Materialized Views in Oracle," Proceedings of the 24th VLDB Conference, New York, USA, 1998, pp. 659-664.
Dr. Lilian Hobs, "Oracle Materialized View & Query Rewrite," May 2005, pp. 1-25.

* cited by examiner

*Primary Examiner*—John E Breene
*Assistant Examiner*—Joshua Bullock
(74) *Attorney, Agent, or Firm*—Hickman Palermo Truong & Becker LLP

(57) ABSTRACT

In one embodiment, a plurality of materialized views is stored, where each view includes a set of aggregate expressions. Storing each materialized view comprises identifying one or more disjuncts in the set of aggregate expressions, generating a set of disjunct trees that represent the set of aggregate expressions, and storing the set of disjunct trees. When a query that requests aggregated data is received, one or more disjuncts are identified in an aggregate expression specified in the query. A disjunct tree for the disjuncts in the query is generated. Based on the disjunct tree for the query and on the set of disjunct trees for each materialized view, a particular materialized view is determined from the plurality of materialized views. The query is rewritten into an equivalent query that references the particular materialized view, where the equivalent query would retrieve the requested aggregated data from the particular materialized view.

22 Claims, 4 Drawing Sheets

Disjunct Tree with Unique Disjuncts for Aggregate Expression
SUM((5A + 10B) * (C - 2D) + 5)

SUPPORTING AGGREGATE EXPRESSIONS IN QUERY REWRITE

FIELD OF THE INVENTION

The present invention generally relates to query processing. The invention relates more specifically to supporting aggregate expressions in query rewriting.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In Database Management Systems (DBMSs) used for "data warehousing" or "decision support", it is common for identical or closely related queries to be issued frequently. For example, a business may periodically generate reports that summarize the business facts stored in a DBMS, such as: "What have been the best selling brands of soft drinks in each of our sales regions, during the past six months?" To respond to such queries, the DBMS may have to perform numerous join, aggregation, and ranking operations. When a data warehouse contains very large amounts of data, certain queries processed by the DBMS can take an unacceptably long time to execute. Thus, among commercial users of data warehousing DBMSs, it has become a common practice to store the results of often-repeated queries in database containers or some other persistent database objects.

As used herein, "materialized view" refers to a database container that stores pre-computed data. In relational database management systems, data may be stored in a materialized view as records (also referred to as "rows"), where each record may include one or more data fields (also referred to as "columns"). In object-oriented databases, data may be stored in a materialized view as objects, where each object may include one or more data attributes. Other types of database architectures may use other terminology to indicate the structures in which data may be stored in a materialized view. For the purpose of explanation, the examples and the terminology used herein shall be that typically associated with relational databases; however, it is noted that the novel techniques for query rewriting described herein are not limited to any particular type of database architecture.

The data stored in a materialized view is typically defined by metadata referred to as a view definition. A view definition typically specifies one or more columns in one or more base tables that contain base data, which may be used to determine the data stored in the materialized view. For example, the following view definition defines the materialized view "MV1",

```
CREATE MATERIALIZED VIEW MV1 AS
  SELECT product, region, SUM(sales)
    FROM t1
    GROUP BY product, region
``` where the expression "SUM(sales)" specifies that the aggregated sum of sales stored in materialized view "MV1" is to be computed on a per-product, per-region basis from base data for all products and regions stored in base table "t1".

Materialized views are often used to stored pre-computed aggregated data. As used herein, "aggregated data" refers to data that is derived by applying one or more aggregate functions to the values in a column of a group of rows in a base table. Examples of aggregate functions include, without limitation, SUM( ), COUNT( ), MIN( ), MAX( ), and AVERAGE( ). Aggregate functions may be specified in aggregate expressions that may be included queries and/or view definitions. As used herein, "aggregate expression" refers to an expression that specifies how the base data from the base tables may be used to compute aggregated data. (For example, the expression "SUM(sales)" in the view definition of materialized view "MV1" provided above is an aggregate expression.)

One approach to avoid frequent access to base tables in a data warehouse involves query rewrite. As used herein, "query rewrite" refers to the computer-implemented process of evaluating a query and generating a rewritten query that requests the same information but can be executed more efficiently. One of the ways to rewrite and improve a query is to rewrite the query to reference a materialized view instead of a base table. The query may be rewritten in this way when the materialized view contains pre-computed aggregated data requested or needed by the query, thus saving much of the cost of aggregating the data already stored in the materialized view. Typically, a query rewrite process would be transparent to the application submitting the original query. That is, a database server may perform the query rewrite process automatically without requiring the application to know about the existence of materialized views, or that a query that accesses a particular materialized view has been substituted for the original query that is written against one or more base tables.

A query rewrite process according to the above approach may use a matching mechanism to match queries with aggregate expressions to materialized views that store aggregated data. This mechanism, however, is capable of matching query aggregate expressions to aggregate expressions specified in view definitions of materialized views using only the associative and commutative properties of algebraic operators. Consequently, this mechanism lacks the ability to match complex aggregate expressions that may specify an arbitrary number of aggregate functions and operators in an arbitrary manner.

For example, by using the associative and commutative properties of algebraic operators, the above matching mechanism may be capable of performing the following aggregate expression matches when these aggregate expressions are present in queries and/or materialized view definitions used by the query rewrite process:

| | | |
|---|---|---|
| SUM(c1 + c2) | to | SUM(c2 + c1) |
| SUM(2 * c1) | to | SUM(c1 * 2) |
| SUM((c1 + c2) + c3) | to | SUM(c1 + (c2 + c3)) |

However, since the above matching mechanism lacks the ability to use the distributive property of algebraic operators, the above matching mechanism is not capable of performing the following aggregate expression matches when these aggregate expressions are present in queries and/or materialized view definitions used by the query rewrite process:

| | | |
|---|---|---|
| SUM(c1 * (c2 + c3)) | to | SUM(c1 * c2 + c1 * c3) |
| SUM(2 * c1) | to | SUM(10 * c1) |

| -continued | | |
|---|---|---|
| SUM(c1) | to | SUM(c1 + 100) |
| SUM(c1 − c2) | to | SUM(−c2 + c1) |
| SUM(c1), SUM(c2) | to | SUM(c1 + c2) |

(In the above aggregate expressions, "c1", "c2", "c3", etc. refer to the names of columns in one or more database containers such as, for example, base tables and materialized views.)

Based on the foregoing, it is desirable to provide techniques for a query rewrite process, which techniques support matching of arbitrarily complex aggregate expressions and overcome the deficiencies of the above-described matching mechanism.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
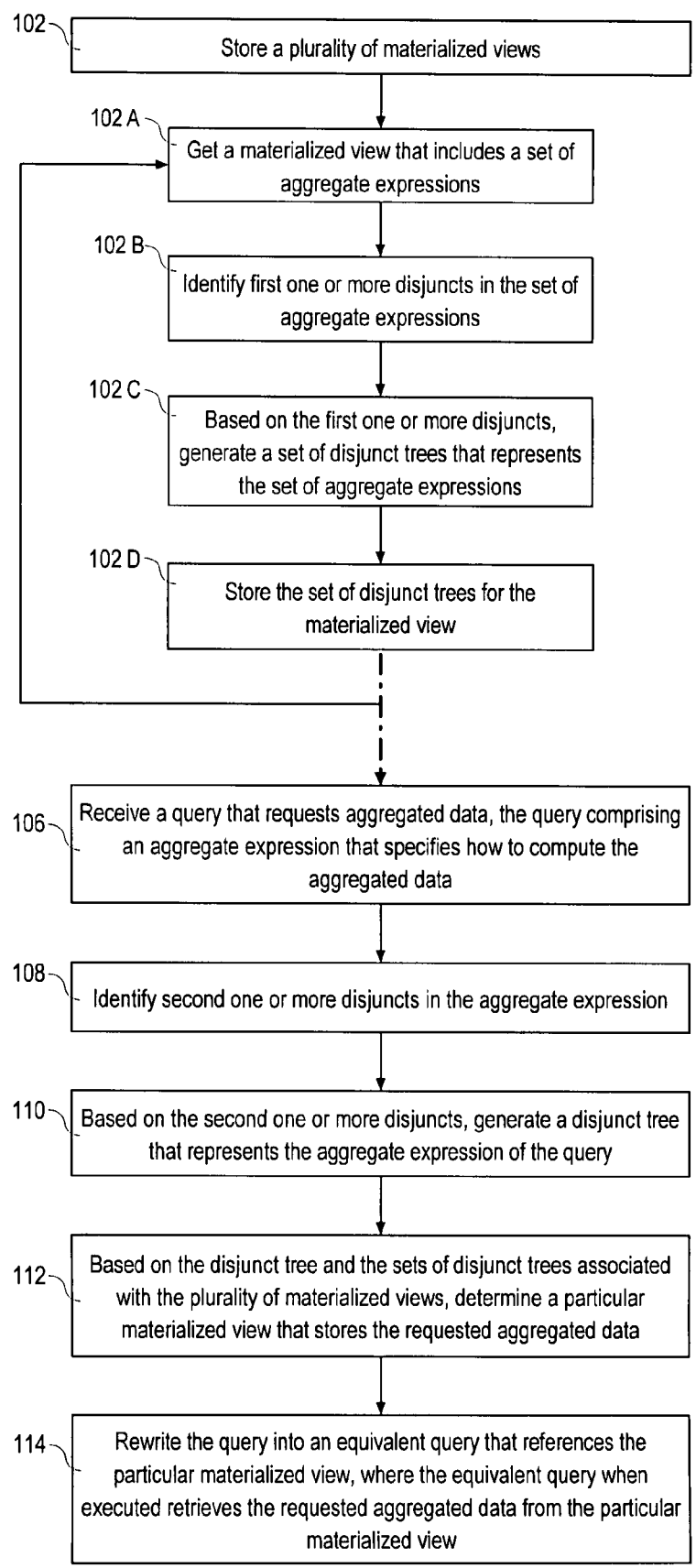
FIG. 1 is a flow diagram that illustrates an overview of a method for query rewriting according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Mechanisms for matching aggregate expressions in prior query rewrite approaches lack the ability to use the distributive property of algebraic operators that may be included in the aggregate expressions. One of the reasons for this is that these matching mechanisms use static strings to match aggregate expressions included in queries and materialized views, where a single static string represents an entire aggregate expression. (It is noted that aggregate expressions are included in view definitions of materialized views; however, as a convenient way to express the same meaning, a materialized view may be referred to herein as comprising or including an aggregate expression.) For example, a materialized view may comprise the following two aggregate expressions:

SUM(c1), SUM(c2), and a query may comprise the aggregate expression

SUM(c1+c2).

Since the matching mechanisms used in prior query rewrite approaches rely on static strings to perform aggregate expression matching, the two aggregate expressions ("SUM(c1)" and "SUM(c2)") in the above materialized view would not be matched to the single aggregate expression ("SUM(c1+c2)") in the above query even though the aggregate expression in the query can be derived from the two aggregate expressions in the materialized view.

I. General Overview

In contrast to the matching mechanisms used in prior query rewrite approaches, techniques are described herein that provide for matching complex aggregate expressions in query rewrite processes by supporting the distributive property of algebraic operators. The techniques described herein provide for identifying disjuncts that are included in the aggregate expressions specified in materialized views, and for storing metadata information about the identified disjuncts.

As used herein, "disjunct" refers to a building block of an expression. A disjunct may be, without limitation, a constant value, a column specified in the aggregate expression, and an expression that specifies one or more operations that involve multiple columns and/or multiplicative constants. The disjuncts in a given aggregate expression may be determined by completely expanding out the aggregate expression. For example, the aggregate expression SUM(c1*(c2+c3))

can be expanded to

SUM(c1*c2+c1*c3), and "c1*c2" and "c1*c3" may be identified as the disjuncts included in the expression. (As a convenient way to express the same meaning, a disjunct that is a product of two columns such as "A*B" may be also be referred to herein as "AB"; similarly, a disjunct that is a product of a multiplicative constant and a column such as "2*A" may also be referred to herein as "2A".)

According to the techniques described herein, individual columns and expressions that comprise the disjuncts of a given aggregate expression are identified and used to generate and store a disjunct tree that represents that aggregate expression. Based on the disjunct trees for a set of aggregate expressions, a canonical form closure for the set of aggregate expressions is generated; the canonical form closure contains expression representations for all possible combinations of the disjuncts that are included in the set of aggregate expressions. Generating the canonical form closures for the aggregate expressions included in materialized views and in a received query allows the query to be rewritten into an equivalent query against those materialized view or views that store the requested aggregated data by fully utilizing the algebraic properties of associativity, commutativity, and distributivity.

In operation, according to the techniques described herein a plurality of materialized views is stored. Each of the plurality of materialized views comprises a set of aggregate expressions. When a materialized view is stored, one or more disjuncts are identified in the set of aggregate expressions for that view. Based on the one or more identified disjuncts, a set of disjunct trees is generated where a disjunct tree represents each of the set of aggregate expressions included in the materialized view. The set of disjunct trees is stored as metadata information associated with the materialized view.

A query that requests aggregated data is received. The query comprises an aggregate expression that specifies how the aggregated data is to be computed. One or more disjuncts are identified in the aggregate expression included in the query. Based on the one or more identified disjuncts, a disjunct tree that represents the aggregate expression in the query is generated.

Based on the disjunct tree for the query aggregate expression and on the sets of disjunct trees for the plurality of materialized views, one or more particular materialized views are determined from the plurality of materialized views. The one or more particular materialized views store the aggregated data requested in the query. The query is then rewritten into an equivalent query that references the one or more particular materialized views. The equivalent query is such that when executed it would retrieve the same aggregated data from the one or more particular materialized views as the original query.

The techniques described herein are not in any way limited to a particular number of materialized views that may be used in an equivalent query to retrieve the same aggregated data that is requested in the original query. For example, the techniques described herein may be used to determine that the aggregated data requested in the original query is stored in multiple materialized views; accordingly, the automatically generated equivalent query may provide the requested aggregated data by including the appropriate aggregate expression or expressions referencing the multiple materialized views as well as the appropriate join and/or union operators between the multiple views.

The techniques described herein may also be used to match one or more aggregate expressions included a query to multiple aggregate expressions included in a single materialized view; in this case, the query may be rewritten into an equivalent query that can retrieve the requested aggregated data from those multiple columns of the single materialized view that store the aggregated values defined in the multiple aggregate expressions.

In general, the techniques described herein may be used in any computer-implemented query rewrite process that uses matching of aggregate expressions, and for this reason the examples of expression matching and query rewriting provided herein are to be regarded in an illustrative rather than a restrictive sense.

II. Functional Description of an Example Embodiment

FIG. 1 is a flow diagram that illustrates an overview of a method for query rewriting according to one embodiment.

In step 102, a database server generates and stores a plurality of materialized views. As part of generating and storing the plurality of materialized views, according to the techniques described herein the database server performs steps 102A to 102D for each materialized view being generated and stored. The plurality of materialized views may be generated and stored by the database server as a batch, or one by one at different points in time.

As used herein, "database server" may refer to a single server instance or to a cluster of server instances. Generally, a server instance is combination of integrated software components and an allocation of computational resources, such as memory, a node, and processes on the node for executing the integrated software components on one or more processors, where the combination of the software components and computational resources are dedicated to providing a particular type of function on behalf of clients of the server instance. Among other functions of database management, a database server governs and facilitates access to one or more databases, and processes requests and queries by clients to access the databases.

In step 102A, a database server receives a request to generate a materialized view in step 102A. The materialized view may include a set of one or more aggregate expressions. For example, the database server may receive the following Data Definition Language (DDL) command to generate materialized view "MV2":

```
CREATE MATERIALIZED VIEW  MV2  AS
    SELECT c1, c2, S_A = SUM(A), S_B = SUM(B)
        FROM t2
        GROUP BY c1, c2
``` where "c1", "c2", "A", and "B" are columns in base table "t2", and SUM(A) and SUM(B) are two aggregate expressions which indicate that the materialized view would include two columns for storing two aggregated values. (In the above DDL command, "S_A" indicates the name of the column that stores the aggregated value generated based on aggregate expression "SUM(A)" and "S_B" indicates the name of the column that stores the aggregated value generated based on aggregate expression "SUM(B)".)

According to the techniques described herein, in step 102B the database server identifies the disjuncts in the set of aggregate expressions included in the materialized view being processed. If an aggregate expression includes parenthesis, in this step the database server or a component thereof may first expand out an aggregate expression to eliminate the parenthesis before identifying the disjuncts included in that aggregate expression. For instance, in the example of materialized view "MV2", the database server would identify the following disjuncts for each of the two aggregate expressions included in the view:

"A" and "B".

Based on the disjuncts identified in a materialized view, in step 102C the database server or a component thereof generates a set of disjuncts trees for the set of aggregate expressions included in the materialized view being processed. Each disjunct tree in the set of disjunct trees is associated with one aggregate expression and includes the disjuncts that were identified in that aggregate expression. As used herein, "disjunct tree" refers to a data structure that stores metadata information indicating the disjuncts identified in a given aggregate expression. In some embodiments, the disjunct tree data may a hierarchical structures with nodes in one or more hierarchical levels, where each node stores first information indicating a disjunct and a second information (separate from the first information) indicating a multiplicative coefficient associated with that disjunct. It is noted, however, that the techniques described herein are not limited to using hierarchical data structures for storing metadata information that indicates the disjuncts identified in an aggregate expression. Rather, any data structures that can store information may be used including, but not limited to, tables, linked lists, and various types of arrays.

After generating the set of disjunct trees for the set of aggregate expressions included in the materialized view being processed, in step 102D the database server stores the set of disjunct trees. In association with each disjunct tree, the database server also stores information that identifies the materialized view which includes the aggregate expression represented by that disjunct tree. The information identifying the materialized view may be any appropriate information including, but not limited to, an object identifier that uniquely identifies the materialized view in a database and a name identifier that indicates the materialized view and the database in which the materialized view is stored. The database server may store the set of disjunct trees and the information identifying the associated materialized view in any computer data storage.

As used herein, "computer data storage" refers to any storage that is operable to store data and that may be accessed by a computing device such as, for example, a computer system. A computer data storage may be physically configured in any volatile and/or non-volatile computer-readable medium. According to the techniques described herein, in some embodiments a computer data storage for storing disjunct trees may be implemented in a storage device that includes persistent, non-volatile media such as optical or electromagnetic disks. In some embodiments, a computer data storage for storing disjunct trees may be implemented in a storage device that includes volatile media such as RAM or other dynamic memory. The techniques described herein are not limited to storing disjunct trees in any particular type of storage device or on any particular type of computer-readable medium.

After storing the set of disjunct trees that represent the aggregate expressions included in a materialized view, the database server may process another materialized view (if materialized views are being generated in a batch), or may continue with other processing.

In step 106, the database server or component thereof (e.g. a query engine) receives a query that requests aggregated data. The query comprises one or more aggregate expressions that specify how to compute the aggregated data from data stored in a base table. For example, the database server (or the query engine thereof) may receive the following query "Q1":

```
SELECT c1, c2, SUM(A + B)
   FROM t2
   GROUP BY c1, c2
```

Similarly to identifying disjuncts in aggregate expressions included in materialized views, in step 108 the database server (or the query engine thereof) identifies one or more disjuncts in the aggregate expressions specified in the received query. For example, in the above query "Q1" the database server would identify the following disjunct:

A+B

Based on the one or more disjuncts identified in the aggregate expression specified in the query, in step 110 the database server would generate a disjunct tree for the disjuncts identified in each aggregate expression in the query.

Based on the disjunct trees representing the aggregate expressions in the received query, and on the sets of disjunct trees stored for the aggregate expressions included in the plurality of materialized views, in step 112 the database server would determine one or more particular materialized views that store the requested aggregated data. For example, with respect to the above query "Q1", the database server would select materialized view "MV2" because the database server would determine (based on the disjunct tree for query "Q1" and the disjunct trees for all of the plurality of materialized views) that "MV2" stores aggregated data requested in query "Q1".

In step 114, the database server (or the query engine thereof) would rewrite the received query into an equivalent query that references the determined one or more particular materialized views. As used herein, "equivalent query" refers to a query which, when executed, returns the same information as another query. According to the techniques described herein, an equivalent query generated by rewriting an original query would retrieve the aggregated data requested in the original query from particular materialized view or views, and not from base tables that may be referenced in the original query. For example, the above query "Q1" may be rewritten into the following equivalent query "EQ2":

```
SELECT c1, c2, SUM(S_A + S_B)
   FROM MV2
```

In some embodiments, rewriting the original query into an equivalent query may involve automatically generating only an in-memory representation (e.g. an Abstract Syntax Tree (AST)) of the equivalent query, which in-memory representation may then be used to generate an execution plan of the equivalent query and/or to execute the equivalent query. In other embodiments, rewriting the original query into an equivalent query may involve automatically generating a text string that expresses the equivalent query, which text string may subsequently be parsed into an in-memory representation that may be used to execute the equivalent query. Thus, the examples provided throughout the present disclosure of equivalent queries (and/or of equivalent aggregate expressions) that are expressed as strings are to be regarded in a purely illustrative rather than a restrictive sense.

III. Generating Canonical Form Closure

In some operational scenarios, the techniques described herein provide for generating a canonical form closure for disjuncts identified in the set of aggregate expressions included in a materialized view. As used herein, "canonical form closure" refers to a collection of expression representations that includes all possible combinations from a particular set of aggregate expressions. According to the techniques described herein, in these operational scenarios an aggregate expression included in a query (as represented by a disjunct tree) is compared to the expression representations included in the canonical form closures associated with a plurality of materialized views. When the query aggregate expression matches an expression representation included in a particular canonical form closure, the materialized view associated with that canonical form closure is selected as the view against which an equivalent query can be generated.

To illustrate how a canonical form closure for a materialized view may be generated, consider a materialized view that includes the following three aggregate expressions:

SUM(c1), SUM(c2), and SUM(c3).

During the creation of the materialized view or during the process of query rewriting, all possible combinations of these aggregate expressions, represented by "c1", "c2", and "c3", are stored in computer data storage as metadata information associated with the materialized view. For the above three aggregate expressions, there are 26 combinations in the canonical form closure for the materialized view, which combinations are listed in Table 1 below.

TABLE 1

Expression Representations for Aggregate Expressions C1, C2, and C3

| Disjuncts | Expression Representations |
|---|---|
| c1 | c1, −c1 |
| c2 | c2, −c2 |
| c3 | c3, −c3 |
| c1, c2 | c1 + c2, c1 − c2, −c1 + c2, −c1 − c2 |
| c1, c3 | c1 + c3, c1 − c3, −c1 + c3, −c1 − c3 |
| c2, c3 | c2 + c3, c2 − c3, −c2 + c3, −c2 − c3 |
| c1, c2, c3 | c1 + c2 + c3, c1 + c2 − c3, −c1 − c2 + c3, |

TABLE 1-continued

Expression Representations for Aggregate Expressions C1, C2, and C3

| Disjuncts | Expression Representations |
|---|---|
| | c1 − c2 − c3, −c1 + c2 + c3, −c1 + c2 − c3, |
| | c1 − c2 + c3, −c1 − c2 − c3 |

In general, for "n" aggregate expressions, the total number of distinct canonical expression representations that can be generated is $$\sum_{i=1}^{n} 2^i \binom{n}{i}$$

(which is the same number as $$\sum_{i=1}^{n} 2^i \frac{n!}{i!(n-i)!}).$$

This is because expression representations need to be generated for every possible combination of the "n" aggregate expressions. There are $$\frac{n!}{i!(n-i)!}$$

different ways to choose "i" distinct aggregate expressions from a set of "n" expressions. Each of these "i" expressions can be preceded by either an addition ("+") operator or a subtraction ("−") operator for a total of "$2^i$" distinct operator permutations, thus yielding a total of $$2^i \binom{n}{i}$$

possibilities for "i" expressions. For example, when there are 4 (i.e. n=4) aggregate expressions in a particular materialized view, there are a total of $$\sum_{i=1}^{4} 2^i \binom{4}{i} = \sum_{i=1}^{4} 2^i \frac{4!}{i!(4-i)!} = 80$$

distinct expression representations in the canonical form closure for that materialized view. For 5 (i.e. n=5) aggregate expressions, there will be a total of $$\sum_{i=1}^{5} 2^i \binom{5}{i} = 242$$

distinct expression representations in a canonical form closure. It is noted that for each of the distinct expression representations there may exist many different but equivalent permutations; however, all of these different permutations can be represented using the distinct expression representations in the canonical form closure.

IV. Representing Aggregate Expressions

According to the techniques described herein, each disjunct identified in the aggregate expression(s) included in a materialized view is stored in a disjunct tree separately from its associated arithmetic operators, additive constants, and/or multiplicative coefficients.

Figure 2:
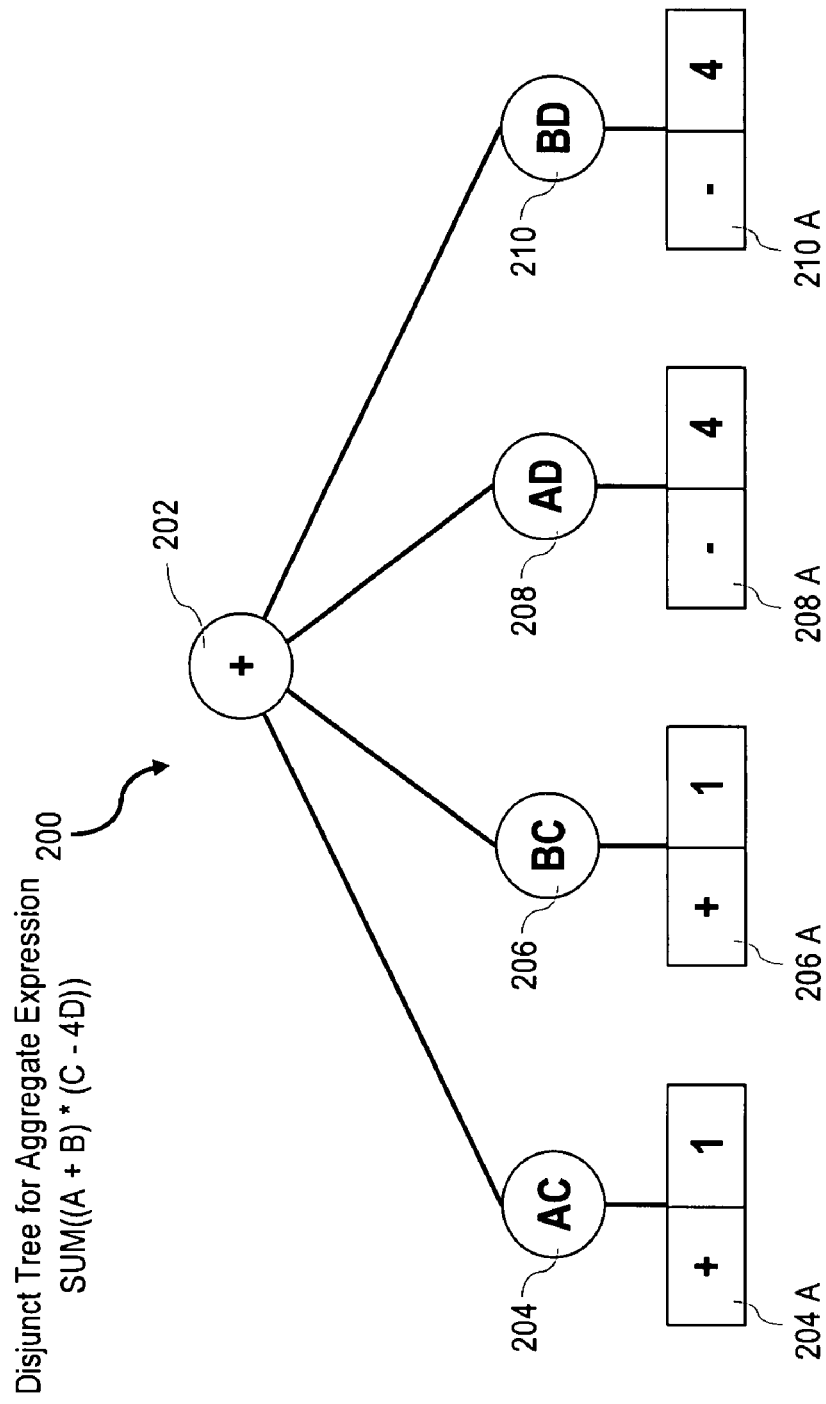
FIG. 2 is a block diagram that illustrates a disjunct tree for an aggregate expression according to one embodiment.

For example, FIG. 2 is a block diagram that illustrates a disjunct tree for the aggregate expression

SUM((A+B)*(C−4D))

according to one embodiment of the techniques described herein. In order to generate disjunct tree 200, in this embodiment the above aggregate expression is first expanded out to remove the parenthesis involved, into the equivalent aggregate expression

SUM(AC+BC−4AD−4BD)

In disjunct tree 200, each node represents a separate canonical form segment. Specifically, the addition operator 202 is stored as the root node of the tree, and disjuncts 204 ("AC"), 206 ("BC"), 208 ("AD"), and 210 ("BD") are stored as leaf nodes of the root node. For each disjunct, the node corresponding to that disjunct stores, in fields that are separate from the fields storing that disjunct, the multiplicative coefficient and the associated algebraic sign. For example, the node storing disjunct 204 stores the algebraic sign "+" and the multiplicative coefficient "1" in fields 204A. Similarly, the node storing disjunct 206 stores the algebraic sign "+" and the multiplicative coefficient "1" in fields 206A; the node storing disjunct 208 stores the algebraic sign "−" and the multiplicative coefficient "4" in fields 208A; and the node storing disjunct 210 stores the algebraic sign "−" and the multiplicative coefficient "4" in fields 210A.

According to the techniques described herein, any arbitrary aggregate expression can be represented using a unique disjunct tree by first expanding out the aggregate expression. For example, both (A+B)*(C−4D)

and

AC+BC−4AD−4BD are equivalent representations of the same aggregate expression, but only the latter is in reduced canonical form.

According to the techniques described herein, the disjunct trees representing aggregate expressions are generated in such way that all identified disjuncts are associated with nodes that are arranged at the same depth level in the tree. This allows a query rewrite process to traverse such disjunct trees in a linear manner while searching for disjuncts; that is, the traversal of disjuncts stored in such trees can be performed in a linear time. Further, since the algebraic signs and multiplicative coefficients are stored in the same nodes as their associated disjuncts, but in separate fields, the techniques described herein can easily match arithmetic operations by using the commutativity, associativity, and distributivity algebraic properties.

V. Identifying Unique Disjuncts in Aggregate Expressions

According to the techniques described herein, when a materialized view includes more than one aggregate expression, the disjuncts in each aggregate expression that do not appear elsewhere in the materialized view are classified as "unique" disjuncts. A unique disjunct may be a column or an expression. For example, if a materialized view contains two aggregate expressions $A1=\text{SUM}(A+B)$ and $A2=\text{SUM}(B+C)$ then the unique disjunct of aggregate expression "A1" is "A" and the unique disjunct of aggregate expression "A2" is "C". In general, a unique disjunct of an aggregate, "AGG", is denoted herein by

U(AGG).

So in the above example, $U(A1)=A$ and $U(A2)=C$.

When a materialized view comprises multiple aggregate expressions, each aggregate expression is likely to contain at least one unique disjunct. This is because without unique disjuncts such aggregate expressions may become redundant As described in the following section, identifying the unique disjuncts in the aggregate expressions of a materialized view may be used for rewriting query aggregates that contain multiple disjuncts.

VI. Generating Disjunct Trees

According to the techniques described herein, during materialized view creation every aggregate expression is converted and stored in a canonicalized disjunct tree involving a multi-step process. Initially, an aggregate expression would be treated like a mathematical expression and would be expanded out by eliminating any parenthesis. The resulting disjuncts may also be re-arranged based on certain canonical form rules, depending on the schema name, column identifiers, etc.

For example, the aggregate expression $\text{SUM}((5A+10B)*(C-2D)+5)$ may be expanded out and rearranged as the following equivalent expression:

$\text{SUM}(5AC+10BC-10AD-20BD+5)$

The additive constants in the disjuncts may be separated out as this is likely to increase the chances of finding a disjunct match between a received query and a materialized view that includes the above aggregate expression. For example, in the above aggregate expression, the additive constant "5" may be pulled out and stored separately as indicated in the following equivalent expression:

$\text{SUM}(5AC+10BC-10AD-20BD)+\text{SUM}(5)$

If there are multiplicative coefficients associated with the identified disjuncts, their Greatest Common Factor (GCF) may be determined and stored separately. For example, in the first portion of the above aggregate expression, the GCF is "5", and it may be pulled out as indicated in the following equivalent expression:

$5*\text{SUM}(AC+2BC-2AD-4BD)+\text{SUM}(5)$

Thereafter, all unique disjuncts in each aggregate expression are identified, and the aggregate expressions including at least unique disjunct are flagged accordingly.

As an operational example, suppose that a materialized view includes the following two aggregate expressions:

$A1=\text{SUM}((5A+10B)*(C-2D)+5)$ $A2=\text{SUM}(AB+D*(A+2B))$

After transforming these aggregate expressions according to the rules described above, two disjunct trees may be generated to represent each of the following equivalent aggregate expressions:

$A1=5*\text{SUM}(AC+2BC-2AD-4BD)+\text{SUM}(5)$ $A2=\text{SUM}(AB+AD+2BD)$

Ignoring any additive constants, both aggregate expressions "A1" and "A2" are checked to determine whether a disjunct appears in only one aggregate expression. If a disjunct appears in only one aggregate expression, that disjunct is marked as unique. For example, the unique disjuncts in aggregate expressions "A1" and "A2" are as follows $U(A1)=\{AC,BC\}$ and $U(A2)=\{AB\}$.

These unique disjuncts may be marked as they may help a query rewrite process to identify which aggregate expressions to consider during aggregate expression matching.

Figure 3:
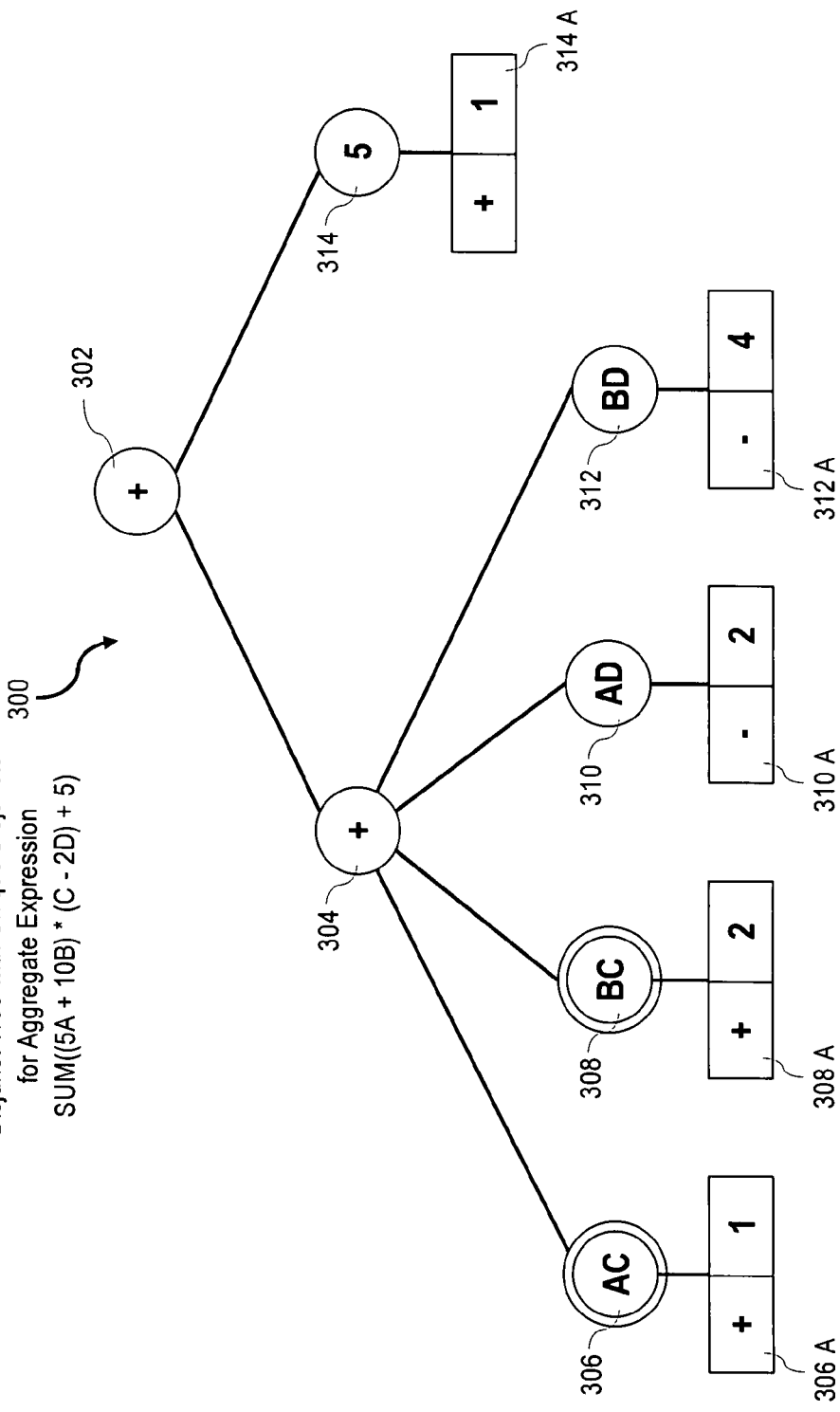
FIG. 3 is a block diagram that illustrates a disjunct tree with unique disjuncts according to one embodiment.

FIG. 3 is a block diagram that illustrates a disjunct tree for the above aggregate expression "A1". In disjunct tree 300, the addition operator 302 is stored as the root node of the tree, the addition operator 304 and the additive constant 314 are stored as child nodes of root node 302, and disjuncts 306 ("AC"), 308 ("BC), 310 ("AD"), and 312 ("BD") are stored as leaf nodes of child node 304. (It is noted that in disjunct tree 300 all disjuncts are stored at the same hierarchical level in the tree, thus facilitating a linear traversal when a disjunct search is performed against the tree.)

For each disjunct in disjunct tree 300, the node corresponding to that disjunct stores, in fields that are separate from the fields storing that disjunct, the multiplicative coefficient and the associated algebraic sign. For example, the node storing additive constant 314 stores the algebraic sign "+" and the multiplicative coefficient "1" in fields 314A. The node storing disjunct 306 stores the algebraic sign "+" and the multiplicative coefficient "1" in fields 306A. Similarly, the node storing disjunct 308 stores the algebraic sign "+" and the multiplicative coefficient "2" in fields 308A; the node storing disjunct 310 stores the algebraic sign "−" and the multiplicative coefficient "2" in fields 310A; and the node storing disjunct 312 stores the algebraic sign "−" and the multiplicative coefficient "4" in fields 312A.

In FIG. 3, the unique disjuncts "AC" and "BC" are illustrated with double-circles around their corresponding nodes in disjunct tree 300. In various implementations of the techniques described herein, marking a disjunct as unique in a disjunct tree may be accomplished in various ways. For example, each node of the disjunct tree may include a separate unique indicator field, where the value in the unique indicator field indicates whether the disjunct associated with that node is classified as unique. The unique indicator field may store a Boolean value, where a value of "True" would indicate that the associated disjunct is classified as unique. Alternatively, a unique indicator field in a tree node may store any value that can be used to discern whether the associated disjunct is classified as unique. In a different example, the unique disjuncts in a disjunct tree may be identified in a field or structure that is stored separately from a node. For instance, an array may be used to indicate which unique disjuncts are stored in which disjunct trees. Thus, the techniques described herein are not limited to any particular manner of marking which disjuncts are classified as unique, and for this reason the examples provided herein for marking disjuncts as unique are to be regarded in an illustrative rather than a restrictive sense.

VII. Aggregate Expression Matching with Unique Disjuncts

According to the techniques described herein, an aggregate expression included in a received query is processed in similar manner as described above with respect to an aggregate expression included in a materialized view. A canonicalized disjunct tree would be generated for the query aggregate expression, and any additive constants and multiplicative coefficients would be separated out.

Once the disjunct tree the query aggregate expression is generated, each of the disjuncts in the tree are compared to the disjuncts in disjunct trees generated for a plurality of materialized views. The materialized views, which are associated with disjunct trees that include disjuncts matching the disjuncts in the query disjuncts tree, are selected as candidate views. As used herein, "candidate view" refers to a materialized view that may be used by an equivalent query to retrieve the aggregated data requested in the original view. Then, the canonical form closure for each candidate view is generated and/or stored as described herein. The query aggregate expression is then compared to the expression representations included in the canonical form closure for each candidate view, until an exact match is found. The candidate view, which is associated with the canonical form closure that includes the matching expression representation, is then selected as the materialized view which is used in the equivalent query. If an exact match for the query aggregate expression is not found in the canonical form closures of the candidate views, then a determination is made that the received query may not be rewritten into an equivalent query and the original query itself may then be executed against base tables.

As complete example of aggregate matching with unique disjuncts, consider the following aggregates that are included in materialized view "MV3":

$A1 = \text{SUM}((5A+10B)*(C-2D)+5)$ $A2 = \text{SUM}(AB+D*(A+2B))$

As discussed in the previous section of the present disclosure, the following equivalent aggregate expressions may be represented in two disjunct trees associated with materialized view "MV3", $A1 = 5*\text{SUM}(AC+2BC-2AD-4D)+\text{SUM}(5)$ $A2 = \text{SUM}(AB+AD+2BD)$ where the unique disjuncts identified in the disjunct trees are $U(A1) = \{AC, BC\}$ and $U(A2) = \{AB\}$.

Now consider a query that includes the following aggregate expression "QA1":

$QA1 = 5*\text{SUM}(2AB+AC+2BC)$

For every disjunct in the above query aggregate expression "QA1", a search is performed to find matching disjuncts in the unique disjunct lists generated for a plurality of materialized views. The searches would find that disjunct "AB" is found in "U(A2)" and that disjuncts "AC" and "BC" are found in "U(A1)", where "U(A2)" and "U(A1)" denote the lists of unique disjuncts marked in the disjunct trees of materialized view "MV3" that represent aggregated expressions "A2" and "A1", respectively. Hence, the query rewrite process would conclude that aggregate expressions "A1" and "A2" in materialized view "MV3" can be potentially used to compute the query aggregate expression "QA1".

Having identified materialized view "MV3" as a candidate view, in the next step the query rewrite process would compute the canonical form closure of aggregate expressions "A1" and "A2". As indicated in a previous section of this disclosure, for two aggregate expressions in a materialized view there would be $$\sum_{i=1}^{2} 2^i \binom{2}{i} = 8$$

distinct combinations of expression representations. These combinations are listed in Table 2 below.

TABLE 2

Expression Representations for Aggregate Expressions A1 and A2

| No. | Combinations | Expression Representations |
| --- | --- | --- |
| 1 | A1 | 5AC + 10BC − 10AD − 20BD |
| 2 | A1 | 5AC − 10BC + 10AD + 20B |
| 3 | 10A2 | 10AB + 10AD + 20BD |
| 4 | 10A2 | 10AB − 10AD − 20BD |
| 5 | A1 + 10A2 | 10AB + 5AC + 10BC |
| 6 | A1 − 10A2 | 5AC + 10BC − 20AD − 40BD − 10AB |
| 7 | A1 + 10A2 | 5AC − 10BC + 20AD + 40BD + 10AB |
| 8 | A1 − 10A2 | 5AC − 10BC − 10AB |

Since the multiplicative factor of the unique disjuncts "U(A2)=AB" in the query aggregate expression "QA1" is 10, aggregate expression "A2" is multiplied by 10 when the combinations for the canonical form closure are generated. The transformations involved in considering the multiplicative factor are indicated as follows:

$$QA1 = 5*\text{SUM}((2AB + AC + 2BC)$$

$$= \text{SUM}(10AB + 5AC + 10BC)$$

$$= A1 + 10A2$$

After considering the multiplicative coefficients in the disjuncts identified in aggregate expression "QA1", the query rewrite process would determine that expression representation

"A1+10A2"

in combination No. 5 of Table 2 would exactly match with the query aggregate expression "QA1".

In this manner, even though an aggregate expression with "d" disjuncts has "d!" distinct permutations, the aggregate expression has only one unique expression representation in the canonical form closure. This means that once the canonical form closure of the aggregate expressions in a materialized view are computed, a match to a query aggregate expression can be found in linear time.

VIII. Aggregate Expression Matching without Unique Disjuncts

The technique presented in the previous section identified unique disjuncts in each aggregate expression included in a materialized view. This situation would be valid for a vast majority of operational scenarios since materialized views including multiple aggregate expressions usually include different disjuncts as otherwise the materialized views would be storing redundant information. Occasionally, however, there may be a need to design a materialized view including two or more aggregates that may be computed from the same columns of one or more base tables. In this operational scenario, the technique presented in the previous section could not be applied directly as it depends on being able to identify unique disjuncts for the separate aggregate expressions included in the materialized view. For such operational scenario, the techniques described herein include a technique for aggregate expression matching without unique disjuncts.

As an example, consider a materialized view that has "n" aggregate expressions, where none of the aggregate expressions includes any unique disjuncts. During materialized view creation, disjunct trees for these aggregate expressions would be generated and stored in computer data storage as described heretofore, except that none of the disjuncts in the disjuncts trees would be marked as unique. An aggregate expression in a received query would undergo similar transformations and a canonicalized disjunct tree for that aggregate expression would be generated. Then, in order to successfully and efficiently match the query aggregate expression to a suitable expression representation in the canonical form closure of the materialized view, a minimal set of aggregate expressions needs to be found among the "n" aggregate expressions in the view.

Presuming that there are "m" disjuncts in the query disjunct tree, a query rewrite process checks to determine whether any of the individual "n" aggregate expressions in a particular materialized view includes all of the "m" query disjuncts. This can be done in $$\binom{n}{1}$$

ways. If one of the aggregate expressions completely includes or matches with all of the query disjuncts, then the query rewrite process checks to determine whether the aggregate expression included in the query matches with the aggregate expression included in the particular materialized view. If not, then the query rewrite process checks to determine whether any two of the "n" aggregate expressions included in the particular materialized view includes all of the "m" disjuncts in the query disjunct tree. This can be done in $$\binom{n}{2}$$

ways. If the two aggregate expressions included in the particular materialized view include or match to all of the "m" query disjuncts, then the query rewrite process checks to determine whether the aggregate expression included in the query matches with a combination of the two aggregate expressions included in the particular materialized view. If not, then the query rewrite process repeats the same checks except that this time it checks to determine whether any three of the "n" aggregate expressions included in the particular materialized view includes all of the "m" disjuncts in the query disjunct tree. This incremental search for finding a set of aggregate expressions that includes all of the "m" disjuncts in the query disjunct tree guarantees that the query rewrite process will end up with a minimal set of aggregate expressions from the particular materialized view that include all the "m" disjuncts in the query aggregate expression. Hence, in the worst case scenario the total number of aggregate expressions combinations, from aggregate expressions in the particular materialized view, that need to be examined is $$\binom{n}{1}+\binom{n}{2}+\ldots+\binom{n}{n-1}+\binom{n}{n}$$

It is noted that the terms in the above summation correspond to the entries in the $n^{th}$ row of Pascal's triangle, except for the missing initial term $$\binom{n}{0}.$$

Thus, the above summation would yield a total of $2^n-1$ expression combinations that need to be checked. For example, if a particular materialized view includes four different aggregate expressions, then the upper bound on the total number of aggregate expression combinations that need to be examined during the process of determining a minimal set of aggregate expressions would be $2^4-1=15$.

For a materialized view that includes "n" aggregate expressions where none of the expressions includes any unique disjuncts, the subsets of the "n" aggregate expressions may include some unique disjuncts. This would allow a query rewrite process to apply the aggregate expression matching technique with the unique disjuncts that is described in the previous section of this disclosure.

As an example, consider materialized view "MV4" that includes the following three aggregate expressions "A1", "A2", and "A3", whose fully expanded disjunct forms are also provided:

$A1=\mathrm{SUM}(A*(B+C))=\mathrm{SUM}(AB+AC)$ $A2=\mathrm{SUM}(B*(A+C))=\mathrm{SUM}(AB+BC)$ $A3=\mathrm{SUM}(C*(A+B))=\mathrm{SUM}(AC+BC)$ Table 3 below lists the disjuncts and their associated aggregate expressions for materialized view "MV4":

TABLE 3

Disjuncts and Aggregate Expressions for MV4

| Disjunct | Found in Aggregate | Unique |
|---|---|---|
| AB | A1, A2 | No |
| AC | A1, A3 | No |
| BC | A2, A3 | No |

Suppose that a received query includes the following aggregate expression, "QA2":

$$QA2 = \text{SUM}(A*(B+C)+2BC)$$

The fully expanded disjunct form for the aggregate expression "QA2" is

SUM(AB+AC+2BC).

As discussed above, in order for the query rewrite process to find a minimal set of aggregate expressions from the aggregate expressions included in materialized view "MV4", the query rewrite process needs to examine a maximum of $2^3-1=7$ aggregate expression combinations.

To find the minimal set of aggregate expressions in materialized view "MV4", the query rewrite process would first check whether each of the aggregate expressions "A1", "A2", or "A3" individually includes all of the disjuncts in the query aggregate expression "QA2". Since this is not the case, the query rewrite process would then examine aggregate expressions "A1", "A2", and "A3" two expressions at a time. The query rewrite process would perform this examination until it determines that aggregate expressions "A2" and "A3" include all of the disjuncts in query aggregate expression "QA2" (namely, the disjuncts "AB", "AC", and "BC"). In this manner, the query rewrite process would determine that the minimal set of aggregate expressions includes aggregate expressions "A2" and "A3", and that the query aggregate expression "QA2" can be represented as follows:

$$QA2 = (A2+A3) = AB+AC+2BC$$

In this manner, even though there were no unique disjuncts when aggregate expressions "A1", "A2", and "A3" were considered, unique disjuncts may be found in subsets including less than all three aggregate expressions. For example, when the query rewrite process checks for unique disjuncts in the minimal set including aggregate expressions "A2" and "A3", the query rewrite process would determine that disjuncts "AB" and "AC" are unique disjuncts in that minimal set. Once unique disjuncts are identified in the minimal set of aggregate expressions included in a materialized view, the aggregate expression matching technique with the unique disjuncts that is described in the previous section of this disclosure can be used in generating an equivalent query.

IX. Matching Complex Aggregate Expressions

The techniques presented in the previous sections of this disclosure determined how to match query aggregate expressions based on disjuncts in aggregate expressions included in materialized views. These techniques are based on the observation that unique disjuncts in aggregate expressions included in materialized views can be regarded as the fundamental building blocks from which most of the arbitrary query aggregate expressions can be rewritten. Although these techniques would cover the vast majority of operational scenarios, there may be some rare operational scenarios involving very complex aggregate expressions in which these techniques would not be applicable. To address such rare operational scenarios, two additional techniques for matching complex aggregate expressions are described in the subsections that follow. It is noted that the two additional techniques described below not only address the issues of how to match complex aggregate expressions, but may also be applicable in any context in which rewriting of arbitrary arithmetic expressions may be necessary.

Number of Disjuncts Equal to Number of Aggregate Expressions

When the number of disjuncts identified in a materialized view is equal to the number of aggregate expressions included in that view, the technique described in this subsection enables the rewriting of disjuncts included in a query aggregate expression in terms of the materialized view aggregate expressions.

For example, consider materialized view "MV5" that includes the following two aggregate expressions "A1" and "A2":

$$A1 = \text{SUM}(A+2B)$$

$$A2 = \text{SUM}(2A-B)$$

Suppose that a received query includes the following aggregate expression "QA3"

$$QA3 = \text{SUM}(4A+5B).$$

The aggregate expressions "A1" and "A2" in materialized view "MV5" do not include any unique disjuncts. The number of expression representations included in the canonical form closure for aggregate expressions "A1" and "A2" is $$\sum_{i=1}^{2} 2^i \binom{2}{i} = 8$$

These expression representations are listed in Table 4 below.

TABLE 4

Canonical Form Closure for A1 and A2 of MV5

| No. | Aggregates | Expression Representations |
|---|---|---|
| 1 | A1 | A + 2B |
| 2 | A1 | −A − 2B |
| 3 | A2 | 2A − B |
| 4 | A2 | −2A + B |
| 5 | A1 + A2 | 3A − B |
| 6 | A1 − A2 | −A + 3B |
| 7 | A1 + A2 | A − 3B |
| 8 | A1 − A2 | −A + 3B |

Since neither of aggregate expressions "A1" and "A2" includes any unique disjuncts, and since none of the expression representations listed in Table 4 exactly matches with the query aggregate expression "QA3", a match to an expression representation from the canonical form closure cannot be readily determined.

To address this situation, the technique described in this subsection provides for setting up a set of simultaneous liner equations with the multiplicative coefficients associated with query disjuncts as known parameters, and then solving the set of linear equations in terms of unknown multiplicative coefficients associated with the aggregate expressions included in the materialized view.

With respect to the above example involving materialized view "MV5" and query aggregate expression "QA3", a query rewrite process would first establish the following set of linear equations represented in matrix form:

$$\begin{bmatrix} A1 \\ A2 \end{bmatrix} = \begin{bmatrix} 1 & 2 \\ 2 & -1 \end{bmatrix}$$

The above set of linear equations includes two unknown variables (the multiplicative coefficients associated with aggregate expressions "A1" and "A2"), and two equations in which the known parameters are the multiplicative coefficients associated with query disjuncts "A" and "B".

The query rewrite process may use a component operable to perform matrix algebra operations in order to solve the above matrix form of the set of linear equations, and to obtain the following:

$$A = \frac{A1 + 2A2}{5}$$

$$B = \frac{2A1 - A2}{5}$$

In this manner, the query rewrite process may rewrite query aggregate expression "QA3" in terms of the aggregate expression "A1" and "A2" as follows:

$$QA3 = \text{SUM}(4A + 5B) = \text{SUM}\left(\frac{14A1 - 3A2}{5}\right)$$

Number of Disjuncts Greater than Number of Aggregate Expressions

The technique described in this subsection enables the rewriting of disjuncts included in a query aggregate expression in terms of the aggregate expressions in a materialized view, when the number of disjuncts identified in the materialized view is greater than the number of aggregate expressions included in the view.

For example, consider materialized view "MV6" that includes the following two aggregate expressions "A1" and "A2":

$A1 = \text{SUM}(A+2B-C)$ $A2 = \text{SUM}(2A-B-C)$

Suppose that a received query includes the following aggregate expression "QA4"

$QA4 = \text{SUM}(4A+5B-2C)$.

Since the aggregate expressions "A1" and "A2" in materialized view "MV6" do not include any unique disjuncts, the technique described in this subsection provides for setting up a set of simultaneous liner equations with the multiplicative coefficients associated with query disjuncts as known parameters, and then solving the set of linear equations in terms of unknown multiplicative coefficients associated with the aggregate expressions included in the materialized view.

For example, for materialized view "MV6, a query rewrite process would establish a set of linear equations in the following manner:

$$\begin{bmatrix} A1 \\ A2 \end{bmatrix} = \begin{bmatrix} 1 & 2 & -1 \\ 2 & -1 & -1 \end{bmatrix}$$

Since in materialized view "MV6" there are only two aggregate expressions ("A1" and "A2") and three disjuncts ("A", "B", and "C"), the disjuncts cannot be immediately determined in terms of the materialized view aggregate expressions.

A presumption is made that query aggregate expression "QA4" could be rewritten using the two materialized view aggregate expressions "A1" and "A2" by using some multiplicative coefficients "x" and "y". This presumption would result in the following:

$$QA4 = xA1 + yA2$$
$$= x(A + 2B - C) + y(2A - B - C)$$
$$= (x + 2y)A + (2x - y)B - (x + y)C$$

In the above expression, the multiplicative coefficients for disjuncts "A", "B", and "C" that are expressed in terms of x and y are used to set up the set of linear equations. Since $QA4 = \text{SUM}(4A+5B-2C)$ then the following set of linear equations may be obtained:

$x + 2y = 4$            (1)

$2x - y = 5$            (2)

$x + y = 2$            (3)

Using the above equations (1) and (2), it may be determined that $$x = \frac{13}{5} \text{ and } y = \frac{3}{5}$$

These values for x and y are then substituted in equation (3) to determine whether they satisfy that equation. Since these values for (x, y) do not satisfy the equation (3), a determination is made that query aggregate expression "QA4" cannot be rewritten with aggregate expressions "A1" and "A2" in materialized view "MV6". When the values for (x, y) do satisfy the third equation, these values can be used to rewrite the query aggregate expression in terms of materialized view aggregate expressions. Notably, the technique in the present subsection may yield more that one pair of values for (x, y) that satisfies the remaining equations; thus, when the number of disjuncts in a particular materialized view is greater than the number of aggregate expressions in the view, there may be multiple ways to rewrite a query aggregate expression using the aggregate expressions in the particular materialized view.

X. Hardware Overview

Figure 4:
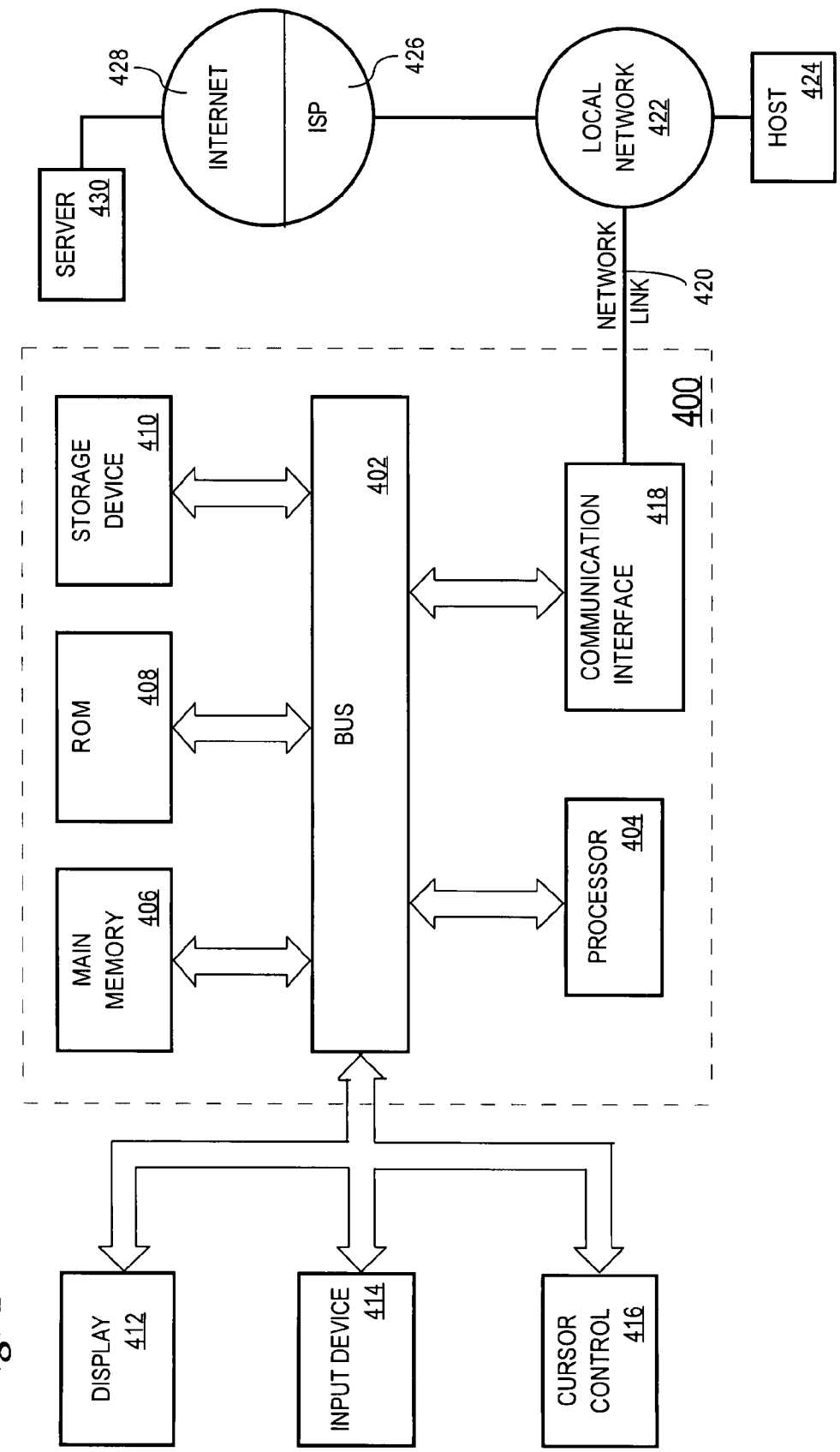
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer system to operation in a specific fashion. In an embodiment implemented using computer system 400, various computer-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a computer.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for rewriting queries, the method comprising:
   storing a plurality of materialized views, wherein a definition of each materialized view of the plurality of materialized views includes a set of aggregate expressions, and wherein storing said each materialized view comprises:
      identifying first one or more disjuncts in the set of aggregate expressions;
      wherein each of the set of aggregate expressions is an expression that specifies, in the definition of said each materialized view, computation of aggregated data;
      wherein each of the first one or more disjuncts is an expression block, included within one or more of the set of aggregate expressions, that identifies at least one column and at least one algebraic operator; and
      generating, based on the first one or more disjuncts, a set of disjunct trees that represent the set of aggregate expressions;
   storing the set of disjunct trees in computer data storage;
   receiving a query that requests particular aggregated data, wherein the query comprises an aggregate expression that specifies how the particular aggregated data is to be computed;
   identifying second one or more disjuncts in the aggregate expression;
   generating, based on the second one or more disjuncts, a disjunct tree that represents the aggregate expression;
   based on the disjunct tree and on the set of disjunct trees associated with said each materialized view of the plurality of materialized views, determining a particular materialized view from the plurality of materialized views that stores the particular aggregated data specified by the aggregate expression; and
   rewriting the query into an equivalent query that references the particular materialized view, wherein the equivalent query when executed would retrieve the particular aggregated data from the particular materialized view;
   wherein the method is performed by one or more computing devices.

2. The method of claim 1, wherein each disjunct tree of the set of disjunct trees includes one or more leaf nodes, wherein each of the one or more leaf nodes is associated with one disjunct of the first one or more disjuncts, and wherein all of the one or more leaf nodes are arranged at the same depth level in said each disjunct tree.

3. The method of claim 1, wherein generating the set of disjunct trees comprises generating each disjunct tree of the set of disjunct trees, wherein said each disjunct tree is associated with one aggregate expression from the set of aggregate expressions, and wherein generating said each disjunct tree comprises:
   determining one or more operators in said one aggregate expression;
   storing the one or more operators in one or more non-leaf nodes of said each disjunct tree; and
   for each disjunct, of the first one or more disjuncts, that is included in said one aggregate expression:
      storing said each disjunct in a leaf node of said each disjunct tree;
      determining a multiplicative coefficient that is associated with said each disjunct in said one aggregate expression; and
      storing the multiplicative coefficient in the leaf node of said each disjunct tree separately from said each disjunct.

4. The method of claim 1, wherein generating the disjunct tree comprises:
   determining one or more operators in the aggregate expression;
   storing the one or more operators in one or more non-leaf nodes of the disjunct tree; and
   for each disjunct of the second one or more disjuncts:
      storing said each disjunct in a leaf node of the disjunct tree;
      determining a multiplicative coefficient that is associated with said each disjunct in the aggregate expression; and
      storing the multiplicative coefficient in the leaf node of the disjunct tree separately from said each disjunct.

5. The method of claim 1, wherein:
   storing said each materialized view further comprises:
      determining a set of unique disjuncts from the first one or more disjuncts in the set of aggregate expressions included in the definition of said each materialized view; and
      storing, in the set of disjunct trees, information that identifies the set of unique disjuncts determined for said each materialized view; and
   determining the particular materialized view from the plurality of materialized views further comprises:
      comparing the second one or more disjuncts in the disjunct tree to the set of unique disjuncts determined for said each materialized view of the plurality of materialized views;
      selecting, in a set of candidate materialized views, all materialized views from the plurality of materialized views that are associated with sets of unique disjuncts that include all of the second one or more disjuncts;
      for each candidate view of the set of candidate materialized views:
         generating a canonical form closure that includes expression representations of all combinations of disjuncts in the set of unique disjuncts associated with said each candidate view; and
         comparing the aggregate expression to the expression representations in the canonical form closure of said each candidate view; and
      from the set of candidate materialized views, selecting as the particular materialized view a candidate view whose canonical form closure includes an expression representation that matches the aggregate expression.

6. The method of claim 5, wherein the canonical form closure for said each candidate view includes $$\sum_{i=1}^{n} 2^i \binom{n}{i}$$

number of expression representations, wherein "n" indicates the number of aggregate expressions in the set of aggregate expressions associated with said each candidate view.

7. The method of claim 1, wherein determining the particular materialized view from the plurality of materialized views comprises:
- for said each materialized view of the plurality of materialized views, determining a minimal set of aggregate expressions from the set of aggregate expressions included in the definition of said each materialized view, wherein the minimal set of aggregate expressions includes all of the second one or more disjuncts;
- determining a set of unique disjuncts in the minimal set of aggregate expressions that is determined for said each materialized view;
- comparing the second one or more disjuncts in the disjunct tree to the set of unique disjuncts;
- selecting, in a set of candidate materialized views, all materialized views from the plurality of materialized views that are associated with sets of unique disjuncts that include all of the second one or more disjuncts;
- for each candidate view of the set of candidate materialized views:
  - generating a canonical form closure that includes expression representations of all combinations of disjuncts in the set of unique disjuncts associated with said each candidate view; and
  - comparing the aggregate expression to the expression representations in the canonical form closure of said each candidate view; and
- from the set of candidate materialized views, selecting as the particular materialized view a candidate view whose canonical form closure includes an expression representation that matches the aggregate expression.

8. The method of claim 7, wherein determining the minimal set of aggregate expressions from the set of aggregate expressions included in the definition of said each materialized view comprises:
- (a) including, in a current set of aggregate expressions, a particular aggregate expression from the set of aggregate expressions;
- (b) determining whether the second one or more disjuncts are included in the current set of aggregate expressions;
- (c) if the second one or more disjuncts are included in the current set of aggregate expressions, then establishing the current set of aggregate expressions as the minimal set of aggregate expressions; and
- (d) if the second one or more disjuncts are not included in the current set of aggregate expressions, then including in the current set of aggregate expressions another aggregate expression from the set of aggregate expressions and repeating steps (b), (c) and (d).

9. The method of claim 1, wherein determining the particular materialized view from the plurality of materialized views comprises:
- determining whether a subset of disjuncts, from the first one or more disjuncts identified in the set of aggregate expressions included in a view definition of a candidate view from the plurality of materialized views, includes all of the second one or more disjuncts;
- when the subset of disjuncts includes all of the second one or more disjuncts, determining one or more multiplicative coefficients that can be used in conjunction with the subset of disjuncts to represent the aggregate expression included in the query; and
- selecting the candidate view as the particular materialized view when the one or more multiplicative coefficients are determined.

10. The method of claim 9, wherein:
when the number of disjuncts in the subset of disjuncts is equal to the number of expressions in the set of aggregate expressions included in the view definition of the candidate view, then determining the one or more multiplicative coefficients comprises:
- setting up a set of linear equations, in which the one or more multiplicative coefficients are unknown variables and the subset of disjuncts are known parameters; and
- solving the set of linear equations to determine the one or more multiplicative coefficients.

11. The method of claim 9, wherein:
when the number of disjuncts in the subset of disjuncts is greater than the number of expressions in the set of aggregate expressions included in the view definition of the candidate view, then determining the one or more multiplicative coefficients comprises:
- setting up a set of linear equations, in which the one or more multiplicative coefficients are unknown variables and the subset of disjuncts are known parameters;
- solving a subset of the set of linear equations to determine one or more candidate coefficients, wherein the subset of the set of linear equations includes a number of equations that is equal to the number of expressions in the set of aggregate expressions;
- substituting the one or more candidate coefficients into all equations, of the set of linear equations, that do not belong to the subset of the set of linear equations; and
- when the one or more candidate coefficients satisfy all the equations that do not belong to the subset of the set of linear equations, then selecting the one or more candidate coefficients as the one or more multiplicative coefficients.

12. A computer-readable volatile or non-volatile medium storing one or more sequences of instructions that comprise instructions for rewriting queries, which instructions when executed by one or more processors cause the one or more processors to perform steps comprising:
- storing a plurality of materialized views, wherein a definition of each materialized view of the plurality of materialized views includes a set of aggregate expressions, and wherein storing said each materialized view comprises:
  - identifying first one or more disjuncts in the set of aggregate expressions;
  - wherein each of the set of aggregate expressions is an expression that specifies, in the definition of said each materialized view, computation of aggregated data;
  - wherein each of the first one or more disjuncts is an expression block, included within one or more of the set of aggregate expressions, that identifies at least one column and at least one algebraic operator; and
  - generating, based on the first one or more disjuncts, a set of disjunct trees that represent the set of aggregate expressions;
- storing the set of disjunct trees in computer data storage;

receiving a query that requests particular aggregated data, wherein the query comprises an aggregate expression that specifies how the particular aggregated data is to be computed;

identifying second one or more disjuncts in the aggregate expression;

generating, based on the second one or more disjuncts, a disjunct tree that represents the aggregate expression;

based on the disjunct tree and on the set of disjunct trees associated with said each materialized view of the plurality of materialized views, determining a particular materialized view from the plurality of materialized views that stores the particular aggregated data specified by the aggregate expression; and rewriting the query into an equivalent query that references the particular materialized view, wherein the equivalent query when executed would retrieve the particular aggregated data from the particular materialized view.

13. The computer-readable volatile or non-volatile medium of claim 12, wherein each disjunct tree of the set of disjunct trees includes one or more leaf nodes, wherein each of the one or more leaf nodes is associated with one disjunct of the first one or more disjuncts, and wherein all of the one or more leaf nodes are arranged at the same depth level in said each disjunct tree.

14. The computer-readable volatile or non-volatile medium of claim 12, wherein the instructions that cause generating the set of disjunct trees comprise instructions which, when executed by the one or more processors, cause generating each disjunct tree of the set of disjunct trees, wherein said each disjunct tree is associated with one aggregate expression from the set of aggregate expressions, and wherein generating said each disjunct tree comprises:

determining one or more operators in said one aggregate expression;

storing the one or more operators in one or more non-leaf nodes of said each disjunct tree; and for each disjunct, of the first one or more disjuncts, that is included in said one aggregate expression:

storing said each disjunct in a leaf node of said each disjunct tree;

determining a multiplicative coefficient that is associated with said each disjunct in said one aggregate expression; and storing the multiplicative coefficient in the leaf node of said each disjunct tree separately from said each disjunct.

15. The computer-readable volatile or non-volatile medium of claim 12, wherein the instructions that cause generating the disjunct tree comprise instructions which, when executed by the one or more processors, cause:

determining one or more operators in the aggregate expression;

storing the one or more operators in one or more non-leaf nodes of the disjunct tree; and for each disjunct of the second one or more disjuncts:

storing said each disjunct in a leaf node of the disjunct tree;

determining a multiplicative coefficient that is associated with said each disjunct in the aggregate expression; and storing the multiplicative coefficient in the leaf node of the disjunct tree separately from said each disjunct.

16. The computer-readable volatile or non-volatile medium of claim 12, wherein:

the instructions that cause storing said each materialized view further comprise instructions which, when executed by the one or more processors, cause:

determining a set of unique disjuncts from the first one or more disjuncts in the set of aggregate expressions included in the definition of said each materialized view; and storing, in the set of disjunct trees, information that identifies the set of unique disjuncts determined for said each materialized view; and the instructions that cause determining the particular materialized view from the plurality of materialized views comprise instructions which, when executed by the one or more processors, cause:

comparing the second one or more disjuncts in the disjunct tree to the set of unique disjuncts determined for said each materialized view of the plurality of materialized views;

selecting, in a set of candidate materialized views, all materialized views from the plurality of materialized views that are associated with sets of unique disjuncts that include all of the second one or more disjuncts;

for each candidate view of the set of candidate materialized views:

generating a canonical form closure that includes expression representations of all combinations of disjuncts in the set of unique disjuncts associated with said each candidate view; and comparing the aggregate expression to the expression representations in the canonical form closure of said each candidate view; and from the set of candidate materialized views, selecting as the particular materialized view a candidate view whose canonical form closure includes an expression representation that matches the aggregate expression.

17. The computer-readable volatile or non-volatile medium of claim 16, wherein the canonical form closure for said each candidate view includes $$\sum_{i=1}^{n} 2^i \binom{n}{i}$$

number of expression representations, wherein "n" indicates the number of aggregate expressions in the set of aggregate expressions associated with said each candidate view.

18. The computer-readable volatile or non-volatile medium of claim 12, wherein the instructions that cause determining the particular materialized view from the plurality of materialized views comprise instructions which, when executed by the one or more processors, cause:

for said each materialized view of the plurality of materialized views, determining a minimal set of aggregate expressions from the set of aggregate expressions included in the definition of said each materialized view, wherein the minimal set of aggregate expressions includes all of the second one or more disjuncts;

determining a set of unique disjuncts in the minimal set of aggregate expressions that is determined for said each materialized view;

comparing the second one or more disjuncts in the disjunct tree to the set of unique disjuncts;

selecting, in a set of candidate materialized views, all materialized views from the plurality of materialized views that are associated with sets of unique disjuncts that include all of the second one or more disjuncts;

for each candidate view of the set of candidate materialized views:

generating a canonical form closure that includes expression representations of all combinations of disjuncts in the set of unique disjuncts associated with said each candidate view; and comparing the aggregate expression to the expression representations in the canonical form closure of said each candidate view; and from the set of candidate materialized views, selecting as the particular materialized view a candidate view whose canonical form closure includes an expression representation that matches the aggregate expression.

19. The computer-readable volatile or non-volatile medium of claim 18, wherein the instructions that cause determining the minimal set of aggregate expressions comprise instructions which, when executed by the one or more processors, cause:

(a) including, in a current set of aggregate expressions, a particular aggregate expression from the set of aggregate expressions;

(b) determining whether the second one or more disjuncts are included in the current set of aggregate expressions;

(c) if the second one or more disjuncts are included in the current set of aggregate expressions, then establishing the current set of aggregate expressions as the minimal set of aggregate expressions; and (d) if the second one or more disjuncts are not included in the current set of aggregate expressions, then including in the current set of aggregate expressions another aggregate expression from the set of aggregate expressions and repeating steps (b), (c) and (d).

20. The computer-readable volatile or non-volatile medium of claim 12, wherein the instructions that cause determining the particular materialized view from the plurality of materialized views comprise instructions which, when executed by the one or more processors, cause:

determining whether a subset of disjuncts, from the first one or more disjuncts identified in the set of aggregate expressions included in a view definition of a candidate view from the plurality of materialized views, includes all of the second one or more disjuncts;

when the subset of disjuncts includes all of the second one or more disjuncts, determining one or more multiplicative coefficients that can be used in conjunction with the subset of disjuncts to represent the aggregate expression included in the query; and selecting the candidate view as the particular materialized view when the one or more multiplicative coefficients are determined.

21. The computer-readable volatile or non-volatile medium of claim 20, wherein:

the number of disjuncts in the subset of disjuncts is equal to the number of expressions in the set of aggregate expressions included in the view definition of the candidate view; and the instructions that cause determining the one or more multiplicative coefficients comprise instructions which, when executed by the one or more processors, cause:

setting up a set of linear equations, in which the one or more multiplicative coefficients are unknown variables and the subset of disjuncts are known parameters; and solving the set of linear equations to determine the one or more multiplicative coefficients.

22. The computer-readable volatile or non-volatile medium of claim 20, wherein:

the number of disjuncts in the subset of disjuncts is greater than the number of expressions in the set of aggregate expressions included in the view definition of the candidate view; and the instructions that cause determining the one or more multiplicative coefficients comprise instructions which, when executed by the one or more processors, cause:

setting up a set of linear equations, in which the one or more multiplicative coefficients are unknown variables and the subset of disjuncts are known parameters;

solving a subset of the set of linear equations to determine one or more candidate coefficients, wherein the subset of the set of linear equations includes a number of equations that is equal to the number of expressions in the set of aggregate expressions;

substituting the one or more candidate coefficients into all equations, of the set of linear equations, that do not belong to the subset of the set of linear equations; and when the one or more candidate coefficients satisfy all the equations that do not belong to the subset of the set of linear equations, then selecting the one or more candidate coefficients as the one or more multiplicative coefficients.

* * * * *

UNITED STATES PATENT AND TRADEMARK OFFICE
CERTIFICATE OF CORRECTION

PATENT NO. : 7,877,376 B2
APPLICATION NO. : 11/879990
DATED : January 25, 2011
INVENTOR(S) : Thiyagarajan et al.

Page 1 of 1

It is certified that error appears in the above-identified patent and that said Letters Patent is hereby corrected as shown below:

In column 12, line 43, delete "("BC"),"  and insert -- ("BC"), --, therefor.

In column 20, line 64, delete "more that" and insert -- more than --, therefor.

Signed and Sealed this
Fourth Day of October, 2011

David J. Kappos
*Director of the United States Patent and Trademark Office*